United States Patent
Chiang et al.

(10) Patent No.: US 11,353,988 B1
(45) Date of Patent: Jun. 7, 2022

(54) TOUCH DISPLAY APPARATUS AND METHOD FOR TOUCH DISPLAY PANEL

(71) Applicant: HIMAX TECHNOLOGIES LIMITED, Tainan (TW)

(72) Inventors: Chin-Yuan Chiang, Tainan (TW); Ho-Chia Hung, Tainan (TW); Li-Lin Liu, Tainan (TW); Chung-Wen Chang, Tainan (TW); Shen-Feng Tai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 3 days.

(21) Appl. No.: 17/180,712

(22) Filed: Feb. 19, 2021

(51) Int. Cl.
G06F 3/041 (2006.01)
G09G 3/36 (2006.01)

(52) U.S. Cl.
CPC ........... G06F 3/04166 (2019.05); G09G 3/36 (2013.01)

(58) Field of Classification Search
CPC .............................. G06F 3/04166; G09G 3/36
See application file for complete search history.

(56) References Cited

U.S. PATENT DOCUMENTS

| | | | | |
|---|---|---|---|---|
| 9,285,913 B1* | 3/2016 | Kang | ................... | G06F 3/04184 |
| 2011/0061949 A1* | 3/2011 | Krah | .................... | G06F 3/04182 |
| | | | | 178/18.06 |
| 2013/0093711 A1* | 4/2013 | Liu | ....................... | G06F 3/0446 |
| | | | | 345/174 |
| 2013/0187887 A1* | 7/2013 | Mizuhashi | ............ | G06F 3/0446 |
| | | | | 345/174 |
| 2014/0145998 A1* | 5/2014 | Liu | ..................... | G06F 3/04182 |
| | | | | 345/174 |
| 2015/0185937 A1* | 7/2015 | Lee | ..................... | G09G 3/2092 |
| | | | | 345/173 |
| 2015/0277657 A1* | 10/2015 | Azumi | ................... | G11C 19/28 |
| | | | | 345/174 |
| 2016/0019827 A1* | 1/2016 | Lee | ..................... | G06F 3/04182 |
| | | | | 345/204 |
| 2016/0132155 A1* | 5/2016 | Lee | ....................... | G06F 3/0443 |
| | | | | 345/174 |
| 2016/0253023 A1* | 9/2016 | Aoyama | ............ | G06F 3/04164 |
| | | | | 345/174 |
| 2016/0328075 A1* | 11/2016 | Luo | .................... | G06F 3/04164 |
| 2017/0060289 A1* | 3/2017 | Shin | ........................ | G09G 3/20 |
| 2017/0168620 A1* | 6/2017 | Gim | .................... | G06F 3/04184 |
| 2017/0168650 A1* | 6/2017 | Lee | ......................... | G06F 3/0412 |
| 2017/0192596 A1* | 7/2017 | Lee | .......................... | G02F 1/13338 |
| 2017/0242529 A1* | 8/2017 | Park | .......................... | G09G 3/20 |
| 2017/0277328 A1* | 9/2017 | Kurasawa | ........... | G06F 3/04164 |
| 2017/0336888 A1* | 11/2017 | Wang | .................. | G06F 3/04182 |
| 2018/0164928 A1* | 6/2018 | Li | ........................ | G02F 1/13338 |

(Continued)

*Primary Examiner* — Benyam Ketema
(74) *Attorney, Agent, or Firm* — CKC & Partners Co., LLC (57) ABSTRACT

A touch display apparatus is disclosed, which includes a touch display panel and a driving circuit. The touch display panel is configured for display and touch sensing, which includes plural touch sensing pads arranged in touch sensing groups. The driving circuit is coupled to the touch display panel, and is configured to drive the touch display panel to perform display with respect to common voltage signal at a display stage of a frame period and to drive the touch display panel to perform touch sensing by applying a touch detection signal to all of the touch sensing pads simultaneously at a touch sensing stage of the frame period.

15 Claims, 11 Drawing Sheets

(56) References Cited

U.S. PATENT DOCUMENTS

| | | | |
|---|---|---|---|
| 2018/0181248 A1* | 6/2018 | Chang | G06F 3/0443 |
| 2019/0155433 A1* | 5/2019 | Park | G06F 3/04184 |
| 2020/0183539 A1* | 6/2020 | Kang | G06F 3/0412 |
| 2021/0200413 A1* | 7/2021 | Jang | G06F 3/04182 |

* cited by examiner

TOUCH DISPLAY APPARATUS AND METHOD FOR TOUCH DISPLAY PANEL

BACKGROUND

Field of the Invention

The invention relates to a touch display, and more particularly to a touch display apparatus and method for a touch display panel.

Description of Related Art

With the advance of electronic product manufacturing technologies, more and more mobile electronic devices, such as smartphones and tablets, have employed touch function for facilitating user operations. Conventionally, touch technologies applied for flat panel displays include a one glass solution (OGS) technology, an on-cell technology and an in-cell technology. Among these technologies, the in-cell technology has at least the advantage of thin design of a liquid crystal display (LCD) because touch electrodes are embedded within the cell structure. However, a user may use a touch display apparatus with the in-cell technology in various scenarios, such as holding it in one hand, placing it on a desk, etc. How to assure accurate touch sensing of such touch display apparatus is an important task for the industries.

SUMMARY

An objective of the invention is to provide a touch display apparatus capable of performing touch sensing with high accuracy even if it is floated and/or a touch area on a touch display panel thereof is large.

One aspect of the invention is directed to a touch display apparatus which includes a touch display panel and a driving circuit. The touch display panel is configured for display and touch sensing, which includes plural touch sensing pads arranged in touch sensing groups. The driving circuit is coupled to the touch display panel, and is configured to drive the touch display panel to perform display with respect to common voltage signal at a display stage of a frame period and to drive the touch display panel to perform touch sensing by applying a touch detection signal to all of the touch sensing pads simultaneously at a touch sensing stage of the frame period.

In accordance with one or more embodiments of the invention, the touch sensing stage includes a block touch sensing stage and an all-on touch sensing stage. In the block touch sensing stage, the driving circuit applies the touch detection signal to the touch sensing groups in sequence. In the all-on touch sensing stage, the driving circuit applies the touch detection signal to all the touch sensing pads simultaneously.

In accordance with one or more embodiments of the invention, the driving circuit is configured to repeat applying the touch detection signal to the touch sensing groups in sequence in one or more times in the block touch sensing stage.

In accordance with one or more embodiments of the invention, the driving circuit is configured to repeat applying the touch detection signal to all the touch sensing pads simultaneously in one or more times in the all-on touch sensing stage.

In accordance with one or more embodiments of the invention, the touch sensing groups are respective blocks of j×k of the touch sensing pads partitioned from a display and touch sensing area of the touch display panel, where j and k are integers greater than 1.

In accordance with one or more embodiments of the invention, the touch sensing groups are respective rows of the touch sensing pads.

In accordance with one or more embodiments of the invention, the touch sensing groups are respective columns of the touch sensing pads.

In accordance with one or more embodiments of the invention, the touch detection signal is an alternative current (AC) voltage signal.

In accordance with one or more embodiments of the invention, the touch display panel is an in-cell type touch display panel.

In accordance with one or more embodiments of the invention, the touch display panel is a liquid crystal display panel.

In accordance with one or more embodiments of the invention, the driving circuit is a touch and display driving integration (TDDI) circuit.

Another aspect of the invention is directed to a method for a touch display panel which includes touch sensing pads arranged in touch sensing groups and is configured for display and touch sensing. The method includes: driving the touch display panel to perform display with respect to a common voltage signal at a display stage of a frame period; and driving the touch display panel to perform touch sensing by applying a touch detection signal to all of the touch sensing pads simultaneously at a touch sensing stage of the frame period.

In accordance with one or more embodiments of the invention, the method further includes: applying the touch detection signal to the touch sensing groups in sequence in a block touch sensing stage of the touch sensing stage; and applying the touch detection signal to all the touch sensing pads simultaneously in an all-on touch sensing stage of the touch sensing stage.

In accordance with one or more embodiments of the invention, the step of applying the touch detection signal to the touch sensing groups in sequence is repeated in one or more times in the block touch sensing stage.

In accordance with one or more embodiments of the invention, the step of applying the touch detection signal to all the touch sensing pads simultaneously is repeated in one or more times in the all-on touch sensing stage.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

The detailed explanation of the invention is described as following. The described preferred embodiments are presented for purposes of illustrations and description, and they are not intended to limit the scope of the invention.

Terms used herein are only used to describe the specific embodiments, which are not used to limit the claims appended herewith. Unless limited otherwise, the term "a," "an," "one" or "the" of the single form may also represent the plural form. Further, the spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the following description and claims, the term "coupled" along with their derivatives, may be used. In particular embodiments, "coupled" may be used to indicate that two or more elements are in direct physical or electrical contact with each other, or may also mean that two or more elements may not be in direct contact with each other. "Coupled" may still be used to indicate that two or more elements cooperate or interact with each other.

The document may repeat reference numerals and/or letters in the various examples. This repetition is for the purpose of simplicity and clarity and does not in itself dictate a relationship between the various embodiments and/or configurations discussed.

Figure 1A:
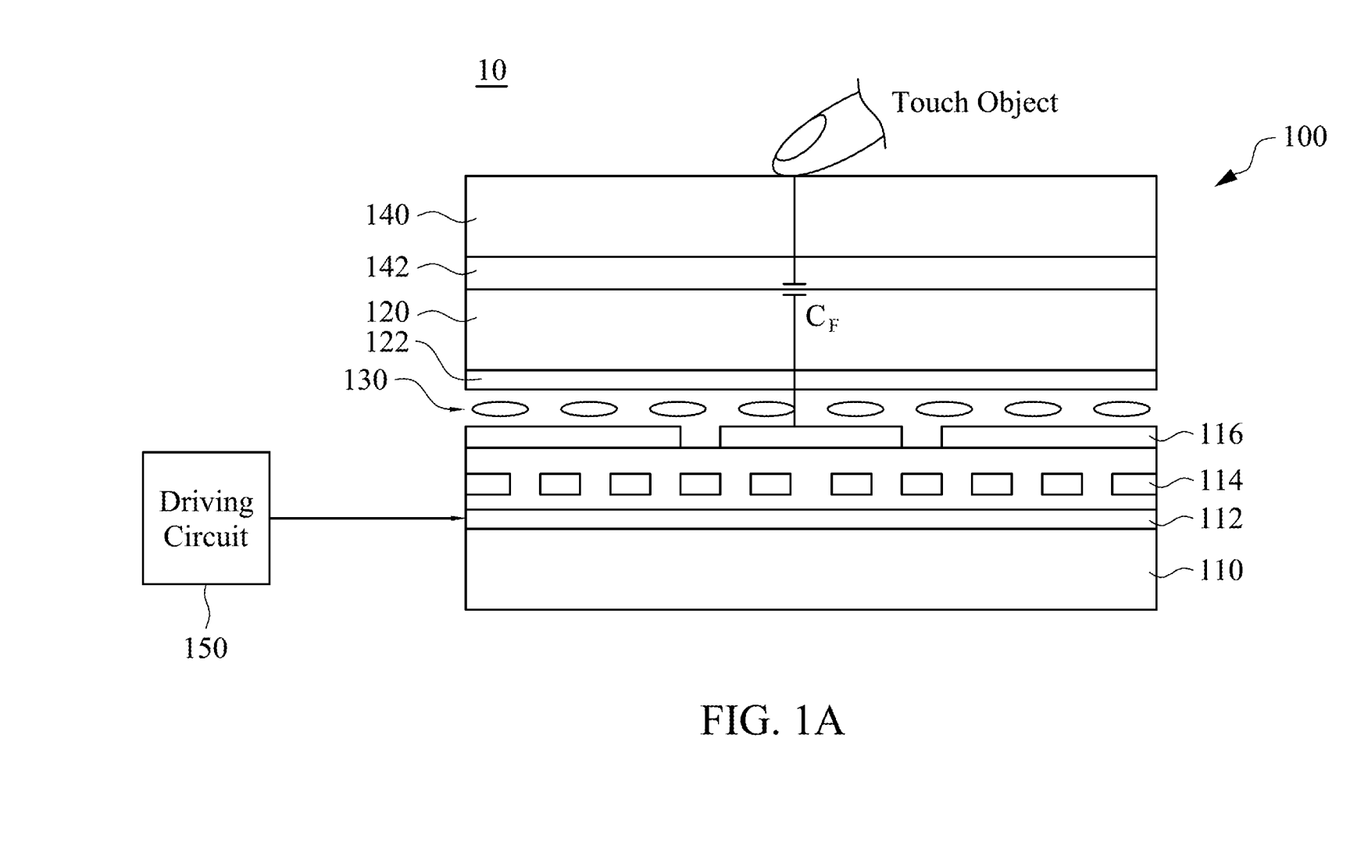
FIG. 1A is a schematic cross sectional view of a touch display apparatus in accordance with some embodiments of the invention.

Referring to FIG. 1A, FIG. 1A is a schematic cross-sectional view of a touch display apparatus 10 in accordance with some embodiments of the invention. The touch display apparatus 10 includes a touch display panel 100 and a driving circuit 150 configured to drive the touch display panel 100 to perform display as well as touch sensing. The touch display panel 100 is an in-cell type touch display panel, and in the touch display panel 100, a thin-film transistor (TFT) substrate 110 and a color filter (CF) substrate 120 are oppositely disposed, and a liquid crystal layer 130 is disposed between the TFT substrate 110 and the CF substrate 120. Scan lines 112, data lines 114, pixel TFTs (not shown), pixel electrodes (not shown) and common electrodes (i.e. of a touch sensing layer 116) are disposed on the TFT substrate 110 for display. The touch sensing layer 116 is also used for touch sensing (e.g. detection of a touch event by a touch object). A color filter layer 122 is disposed on the CF substrate 120, and has color filter units each corresponding to one of pixels of the touch display panel 100 for passing light with a specific color. A cover substrate 140 adheres to the CF substrate 120 via an adhesive layer 142 therebetween for providing at least a protection function and a touch operation interface. As shown in FIG. 1A, a capacitance $C_F$ is measured when a touch object touches the surface of the cover substrate 140. The touch object may be a person's finger, a touch pen, or another suitable object. The driving circuit 150 may be a touch and display driving integration (TDDI) circuit or several circuits which capable of cooperatively perform display driving as well as touch driving on the touch display panel.

Figure 1B:
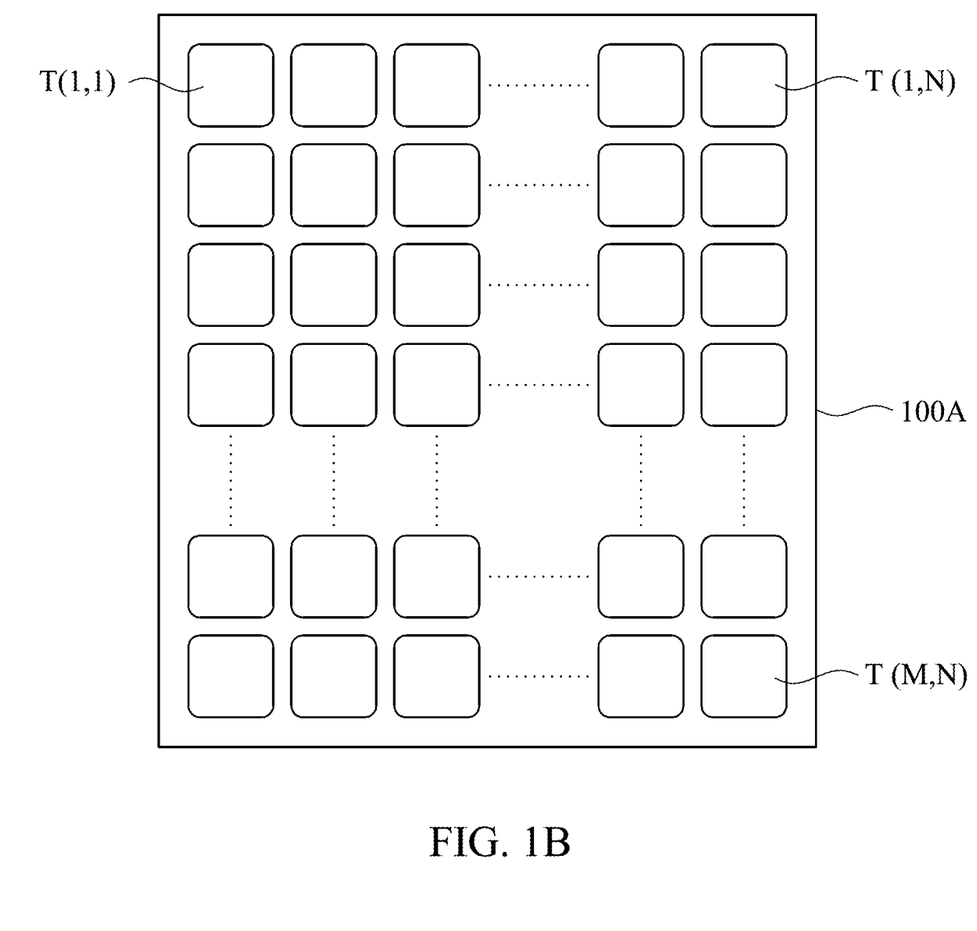
FIG. 1B is a schematic view of touch sensing pads of the touch sensing layer in FIG. 1A in accordance with some embodiments of the invention.

FIG. 1B is a schematic view of touch sensing pads T(1,1)-T(M,N) of the sensing layer 116 in accordance with some embodiments of the invention. The touch sensing pads T(1,1)-T(M,N) may be, as shown in FIG. 1B, arranged in a display and touch sensing area 100A of the touch display panel 100 in a form of M×N array. Each of the touch sensing pads T(1,1)-T(M,N) may be formed of the common electrodes of plural pixels in a particular block. The touch sensing pads T(1,1)-T(M,N) may be separated into touch sensing groups. Depending on the design of the touch display panel 100 and the driving circuit 150, the touch sensing groups may be respective rows of the touch sensing pads T(1,1)-T(M,N), or may be respective columns of the touch sensing pads T(1,1)-T(M,N), or may be respective blocks of j×k of the touch sensing pads T(1,1)-T(M,N) partitioned from the display and touch sensing area 100A, where j and k are integers greater than 1.

Figure 2A:
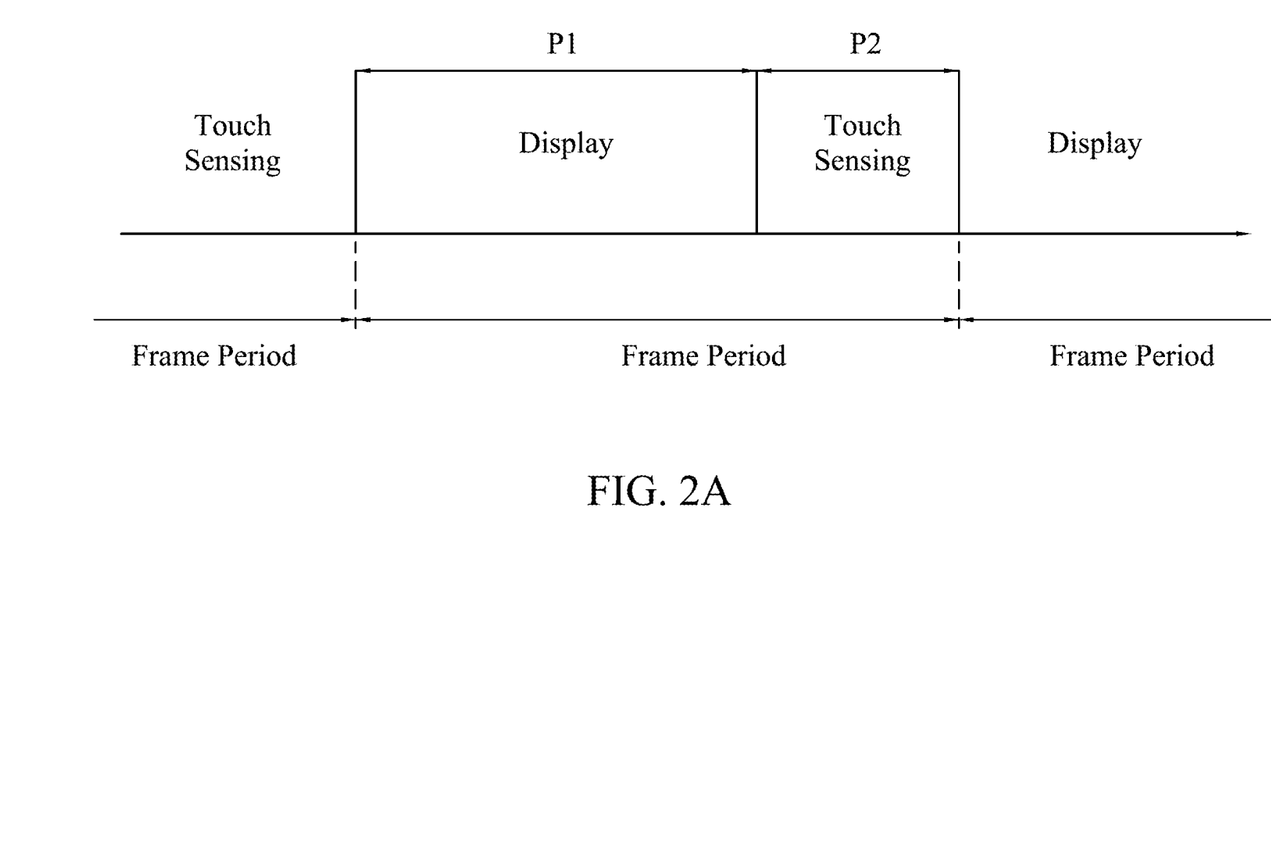
FIG. 2A is a schematic diagram showing a time sequence of operation of the touch display panel of FIG. 1A in accordance with some embodiments of the invention.

FIG. 2A is a schematic diagram showing a time sequence of operation of the touch display panel 100 in accordance with some embodiments of the invention. Each frame period of the touch display panel 100 includes a display stage P1 and a touch sensing stage P2. The display stage P1 and the touch sensing stage P2 of the same frame period may be non-overlapped. In the display stage P1, the driving circuit 150 applies a common voltage signal $V_{COM}$ to the touch display panel 100 for display. Then, in the touch sensing stage P2, the driving circuit 150 applies a touch detection signal $V_{TD}$ to the touch display panel 100 for touch sensing. The common voltage signal $V_{COM}$ applied to the touch display panel 100 during the display stage P1 may be a direct current (DC) voltage signal, and the touch detection signal $V_{TD}$ applied to the touch display panel 100 during the touch sensing stage P2 may be an alternate current (AC) voltage signal with a sinusoidal waveform, a triangle waveform, a sawtooth waveform, a trapezoidal waveform, or the like.

Figure 2B:
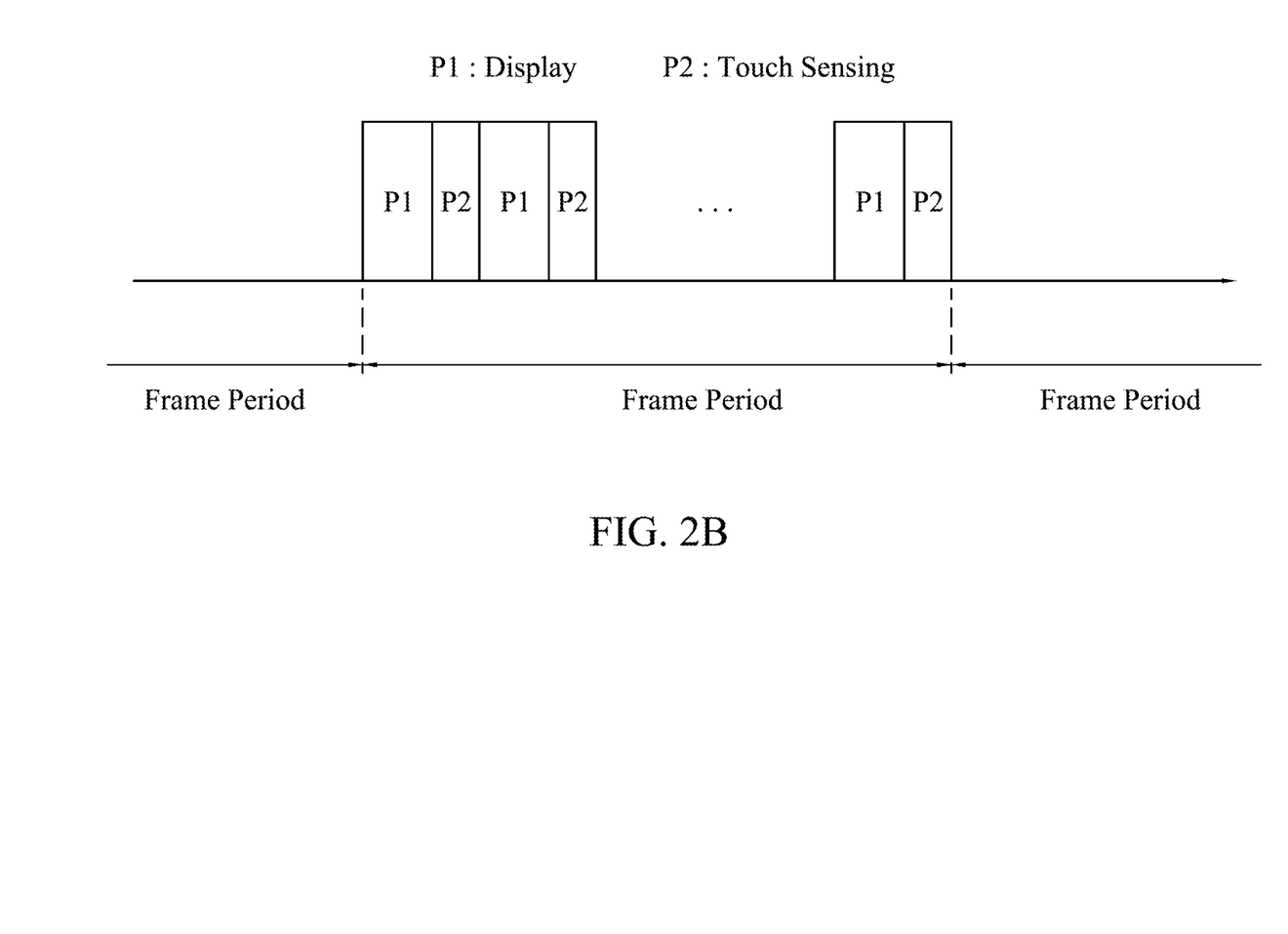
FIG. 2B is a schematic diagram showing a time sequence of operation of the touch display panel of FIG. 1A in accordance with some other embodiments of the invention.

Each frame period of the touch display panel 100 may include plural display stages P1 and plural touch sensing stages P2 in accordance with some other embodiments of the invention. As shown in FIG. 2B, the display stages P1 and the touch sensing stages P2 are alternately arranged in the same frame period. A full image display of the touch display panel 100 in each frame period may be separated into plural parts which are performed respectively in the display stages P1. Similarly, a full touch sensing of the touch display panel 100 in each frame period may be separated into plural parts which are performed respectively in the touch sensing stages P2.

Figure 3A:
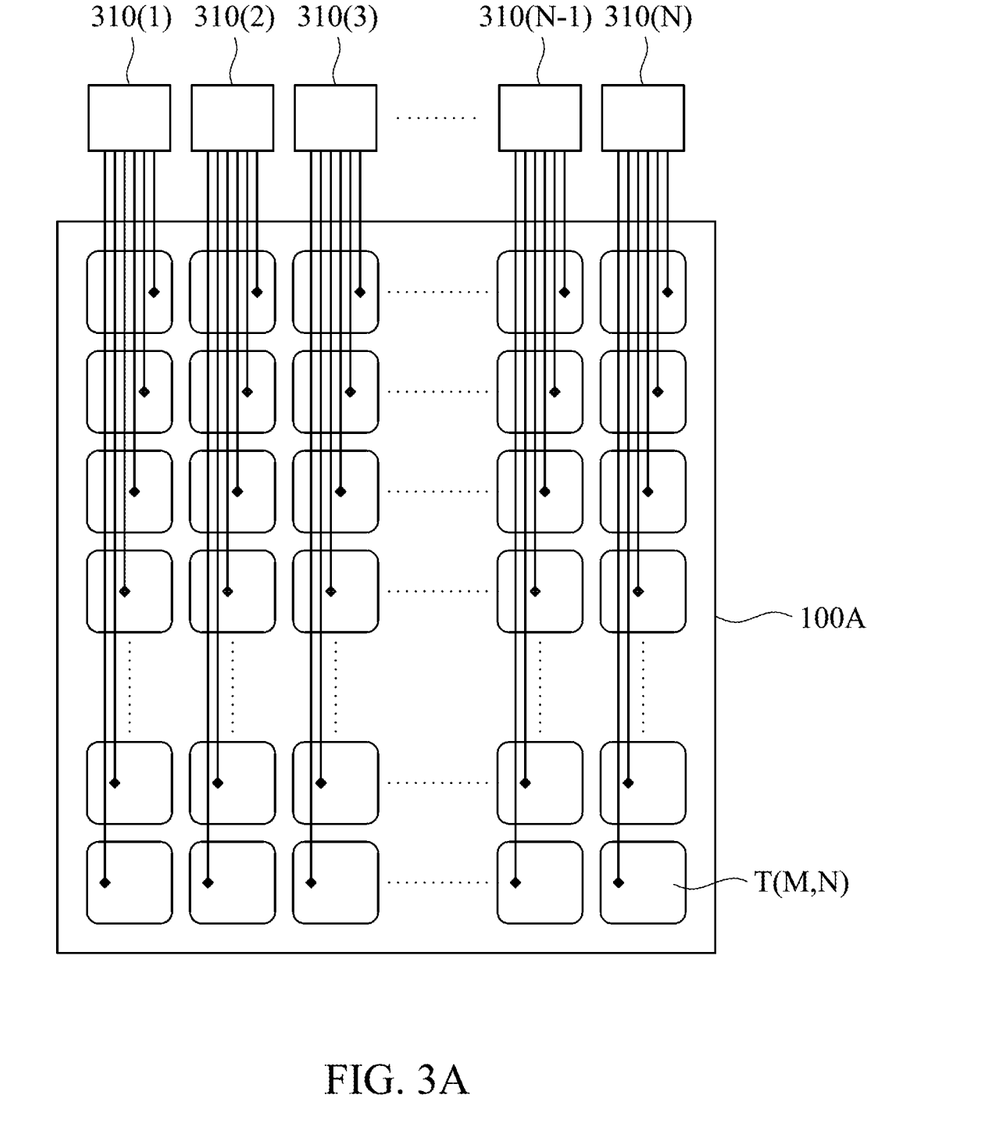
FIG. 3A illustrates circuitries of the driving circuit in FIG. 1A respectively coupled to the touch sensing groups of the touch sensing pads in FIG. 1B in accordance with some embodiments of the invention.

Referring to FIG. 3A, which illustrates circuitries 310(1)-310(N) of the driving circuit 150 respectively coupled to the touch sensing groups of the touch sensing pads T(1,1)-T(M, N) in accordance with some embodiments of the invention. Depending on the design of the touch display panel 100 and the driving circuit 150, the circuitries 310(1)-310(N) may be respectively connected the rows of the touch sensing pads T(1,1)-T(M,N), or may be respectively connected to the columns of the touch sensing pads T(1,1)-T(M,N), or may be respectively connected to blocks of the touch sensing pads T(1,1)-T(M,N) partitioned from the display and touch sensing area 100A. For the embodiments in FIG. 3A, the circuitries 310(1)-310(N) of the driving circuit 150 are electrically connected to the columns of the touch sensing pads T(1,1)-T(M,N) in the display and touch sensing area 100A, respectively. That is, the circuitry 310(i) (i is an integer of 1 to N) of the driving circuit 150 is electrically connected to the touch sensing pads T(1,i)-T(M,i). Also referring to FIG. 3B, the circuitry 310(i) includes selectors 312(1,i)-312(M,i), a multiplexer 314(i) and an integration unit 316(i). The first terminals T1 of the selectors 312(1,i)-312(M,i) are coupled to the touch sensing pads T(1,i)-T(M,i), respectively. The second terminals T2 of the selectors 312(1,i)-312(M,i) are coupled to the integration unit 316(i). The third terminals T3 of the selectors 312(1,i)-312(M,i) are coupled to the node X1 which provides the common voltage signal $V_{COM}$, and the fourth terminals T4 of the selectors 312(1,i)-312(M,i) are coupled to the node X2 which provides the touch detection signal $V_{TD}$.

Figure 3B:
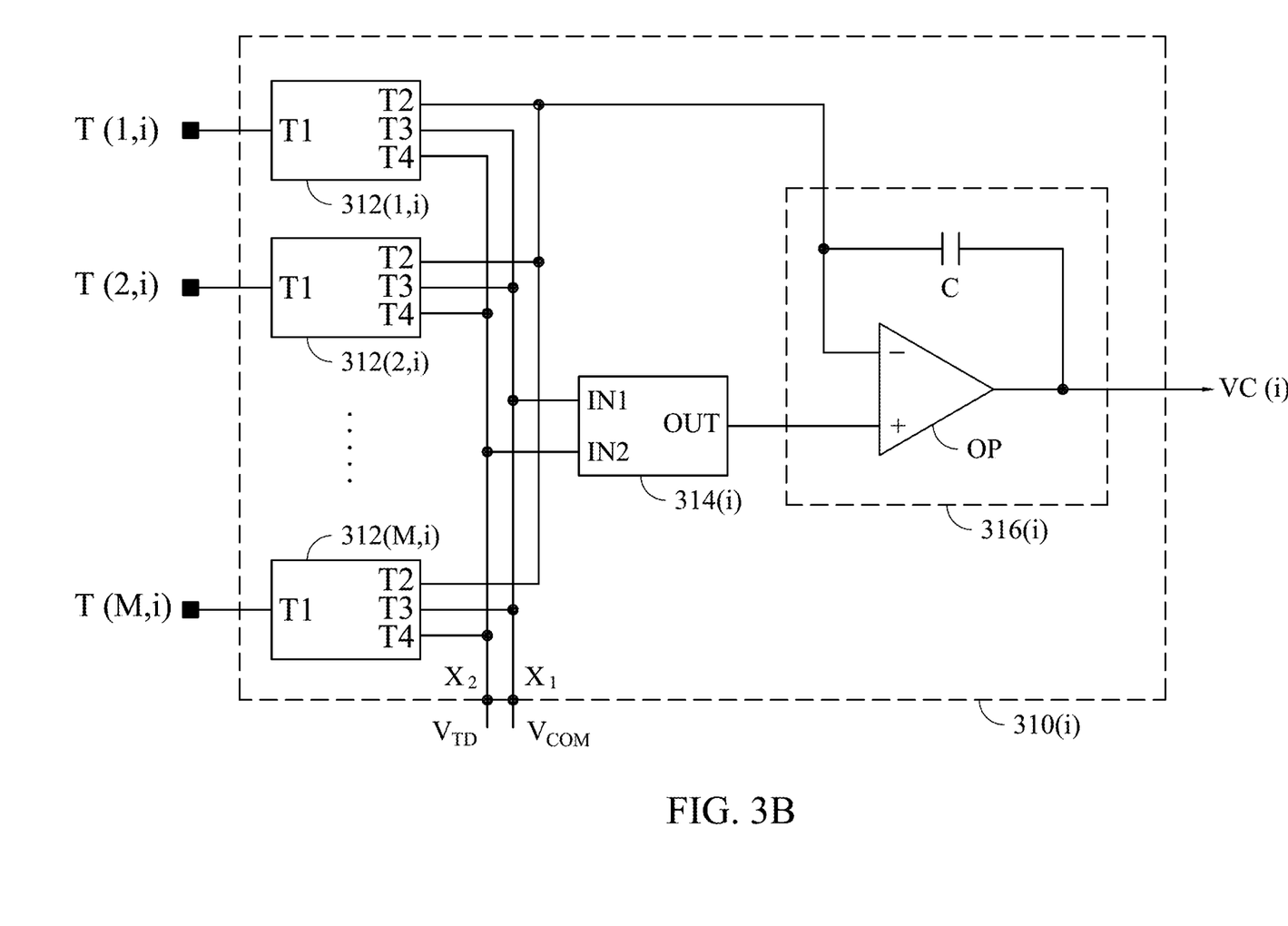
FIG. 3B illustrates a schematic circuit diagram of each circuitry in FIG. 3A in accordance with some embodiments of the invention.

The multiplexer 314(i) is configured to couple which of the nodes X1 and X2 to the integration unit 316(i). When the touch display panel 100 is operated in the display stage P1, the multiplexer 314(i) switches to connect the first input terminal IN1 to the output terminal OUT for coupling the node X1 to the integration unit 316(i). Oppositely, when the touch display panel 100 is operated in the touch sensing stage P2, the multiplexer 314(i) switches to connect the second input terminal IN2 to the output terminal OUT for coupling the node X2 to the integration unit 316(i).

The integration unit 316(i) includes an operational amplifier OP and a capacitor C. The positive input terminal of the operational amplifier OP is coupled to the output terminal of the multiplexer 314(i), the negative input terminal of the operational amplifier OP is coupled to the second terminals T2 of the selectors 312(1,i)-312(M,i), and the output terminal of the operational amplifier OP is configured for outputting a voltage signal VC(i). Two terminals of the capacitor C are respectively coupled to the negative input terminal and the output terminal of the operational amplifier OP. An analog-to-digital converter (not shown) may be configured to convert the voltage signals VC(1)-VC(N) into touch data.

Figure 4:
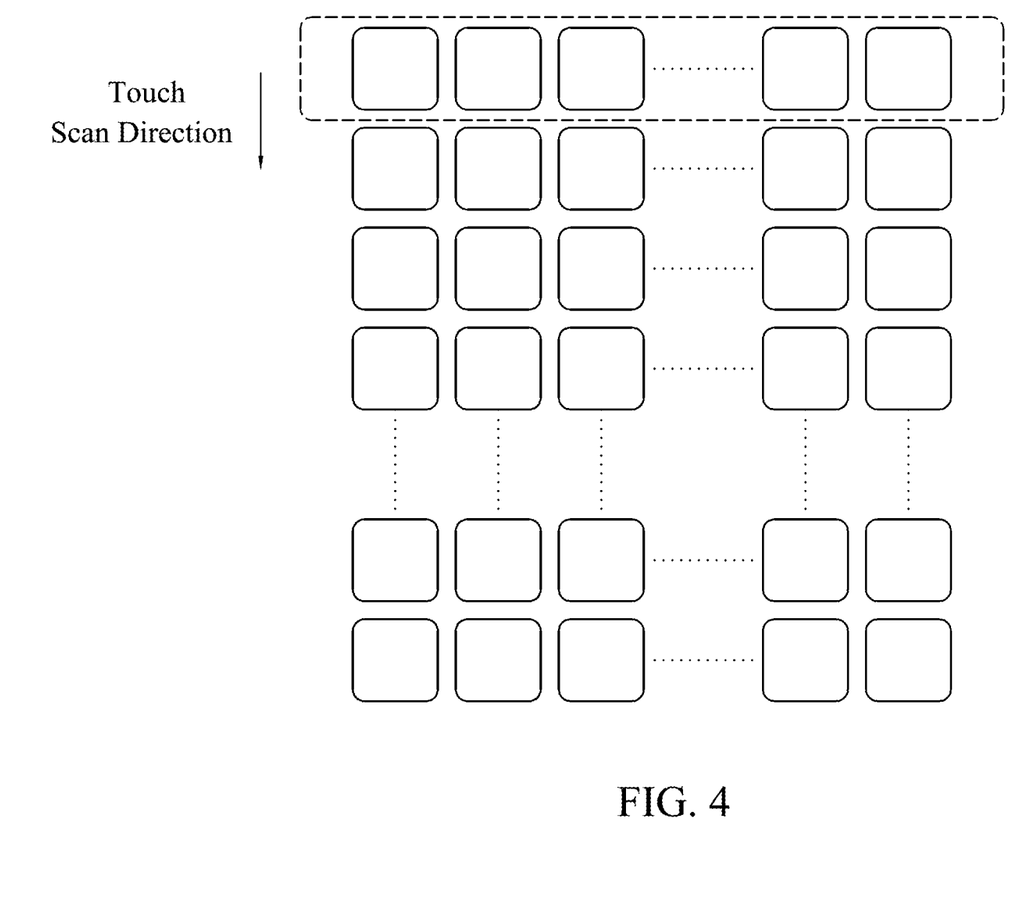
FIG. 4 illustratively shows a touch scan direction of the touch display panel in FIG. 1A in accordance with some examples.

FIG. 4 illustratively shows a touch scan direction of the touch display panel 100 in accordance with some examples. As shown in FIG. 4, the touch scan direction of the touch display panel 100 is from the first row to the last row of the touch sensing pads T(1,1)-T(M,N). In such case, the selectors 312(1,1)-312(M,N) are configured to respectively switch to connect the first terminals T1 to the second terminals T2 row-by-row; that is, the touch sensing pads T(1,1)-T(M,N) are scanned row-by-row for display. For illustration, when the m-th row (1<m<M) of the array starts to be scanned for display during the display stage P1, the selectors 312(m,1)-312(m,N) switch to electrically connect the touch sensing pads T(m,1)-T(m,N) to the integration units 316(1)-316(N), respectively, and the other selectors 312(1,1)-312(m−1,N) and 312(m+1,1)-312(M,N) switch to electrically connect the touch sensing pads T(1,1)-T(m−1,N) and T(m+1,1)-T(M,N) to the node X1, respectively; when the m-th row of the array starts to be scanned for touch sensing during the touch sensing stage P2, the selectors 312(m,1)-312(m,N) switch to electrically connect the touch sensing pads T(m,1)-T(m,N) to the integration units 316(1)-316(N), respectively, and the other selectors 312(1,1)-312(m−1,N) and 312(m+1,1)-312(M,N) switch to electrically connect the touch sensing pads T(1,1)-T(m−1, N) and T(m+1,1)-T(M,N) to the node X2, respectively.

However, when the touch detection signal $V_{TD}$ is applied to a touch sensing pad for touch sensing (i.e. the touch sensing pad is in the active touch sensing group for touch sensing), such touch sensing pad would also generate parasitic capacitances respectively with the corresponding scan lines and data lines. These unwanted parasitic capacitances would induce a significant panel loading and adversely affect touch sensing accuracy. In order to reduce the panel loading, the driving circuit 150 also provides load canceling signals to the corresponding scan lines and data lines with the voltage level identical to that of the touch detection signal $V_{TD}$ for eliminating the parasitic capacitances. Moreover, for a touch sensing pad not in the active touch sensing group for touch sensing (i.e. in a period where the touch detection signal $V_{TD}$ is not applied thereto), the driving circuit 150 also applies load canceling signals to the corresponding scan lines and data lines with the same voltage level.

Figure 5A:
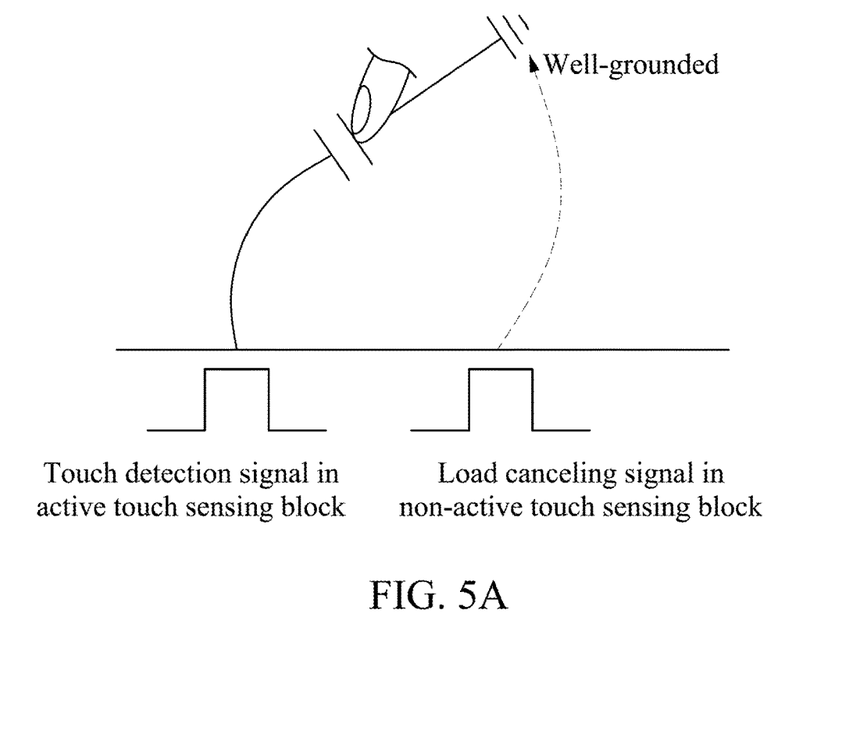
FIG. 5A illustratively shows a touch operation on the touch display apparatus in FIG. 1A that is well-grounded.

FIG. 5A illustratively shows a touch operation on the touch display apparatus 10 that is well-grounded (e.g. the touch display apparatus 10 is held by a user). As shown in FIG. 5A, because the touch display apparatus 10 is well-grounded, the load canceling signal flows into the ground and does not couple to a touch object to affect touch sensing.

Figure 5B:
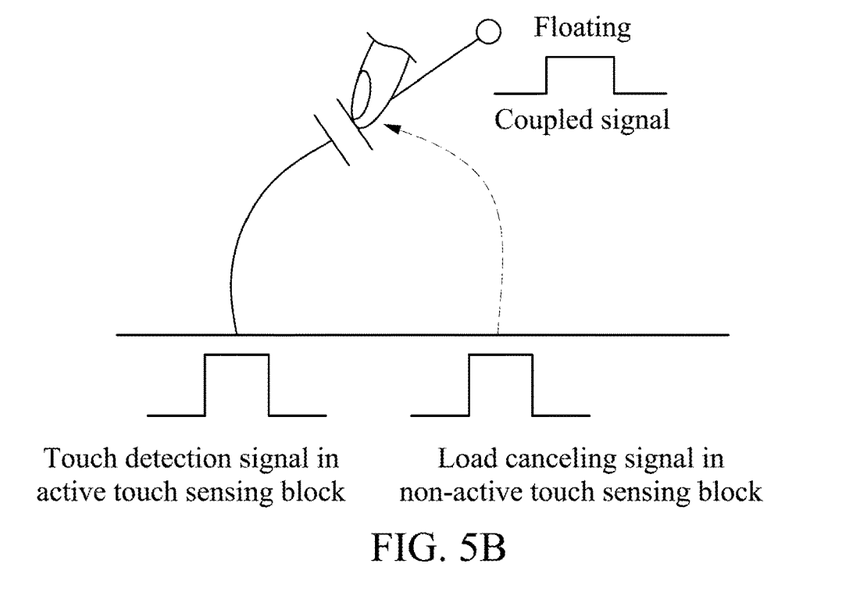
FIG. 5B illustratively shows a touch operation on the touch display apparatus in FIG. 1A that is floated.

However, in some cases such as the touch display apparatus 10 is floated, the load canceling signal would cause touch sensing problems. FIG. 5B illustratively shows a touch operation on the touch display apparatus 10 that is floated (e.g. placed on a desk). As shown in FIG. 5B, because the touch display apparatus 10 is floated, the load canceling signal is couple to a touch object to generate a coupled signal. Such coupled signal may be in proportion to the signal touch area size of the touch object. The coupled signal would be large to weaken or even cancel the touch detection signal in the active touch sensing group if the touch area is large, resulting in unable to accurately detect a touch event.

Figure 6:
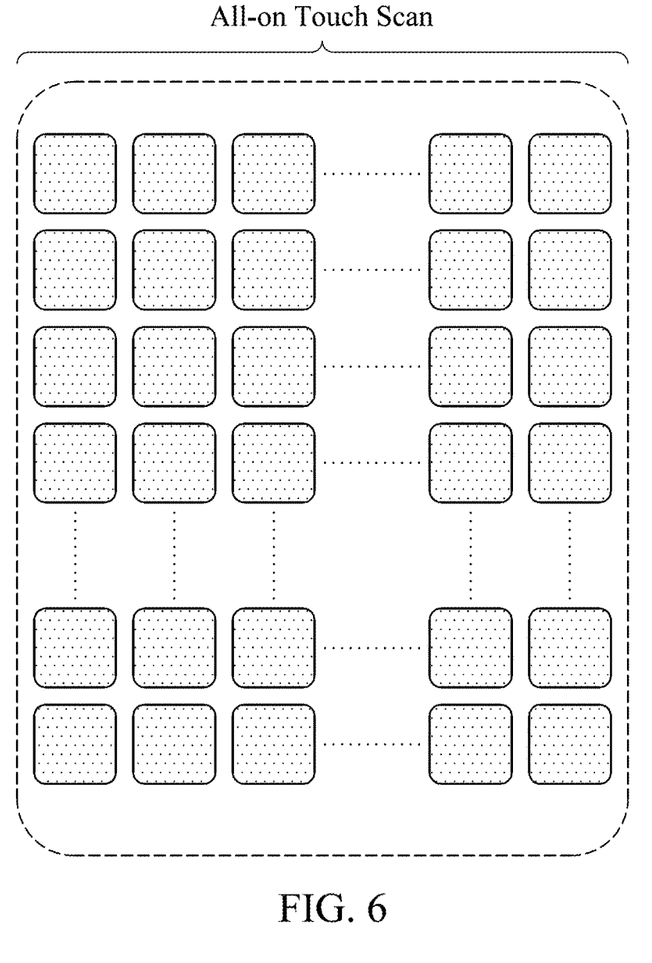
FIG. 6 illustratively shows all-on touch scan of the touch display panel in FIG. 1A in accordance with some embodiments of the invention.

FIG. 6 illustratively shows all-on touch scan of the touch display panel 100 in accordance with some embodiments of the invention. In FIG. 6, the touch sensing pads T(1,1)-T(M,N) of the touch display panel 100 are simultaneously scanned for touch sensing. In other words, the touch detection signal $V_{TD}$ is applied to all the touch sensing pads T(1,1)-T(M,N) at the same time for touch sensing. In such case, each of the selectors 312(1,1)-312(M,N) is configured to switch to connect the first terminal T1 to the second terminal T2 for the embodiments of FIGS. 3A and 3B. Because the touch sensing pads T(1,1)-T(M,N) are all active for touch sensing at the same time, regardless of whether the touch display apparatus 10 is well-grounded or floated, the touch display panel 100 may detect a touch event of a touch object even with a large touch area. In addition, with such configuration, the driving circuit 150 may not provide load canceling signals to any of the scan lines and the data lines, which avoids affecting touch sensing of the touch display panel 100 in a floating state and makes the touch driving method of the touch display panel 100 simpler.

Figure 7:
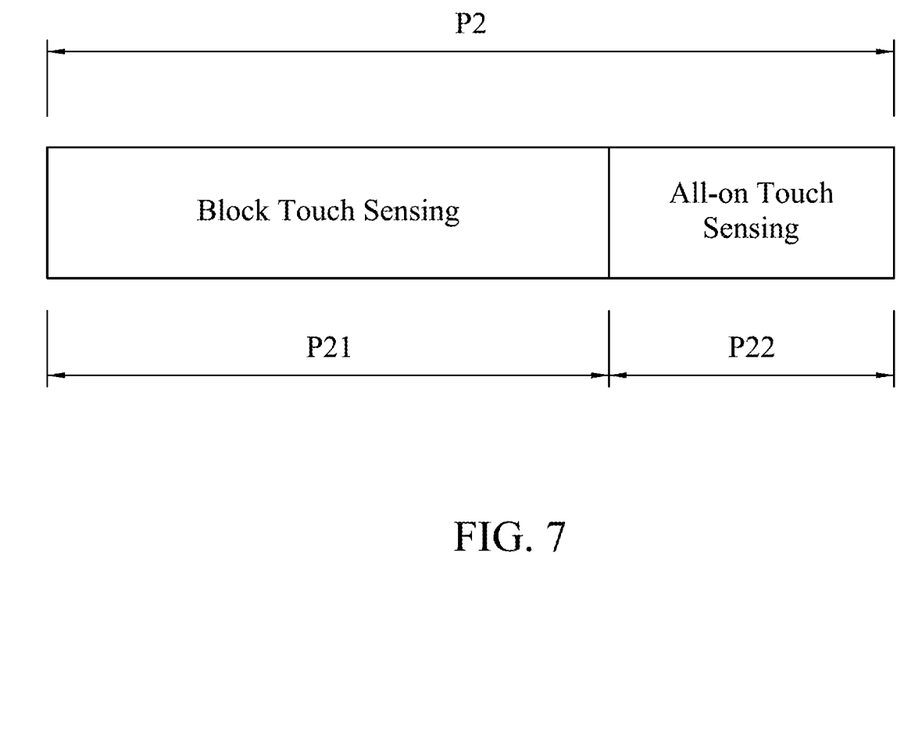
FIG. 7 is a schematic diagram showing a time sequence of operation in the touch sensing stage of the touch display panel in FIG. 1A in accordance with some embodiments of the invention.

FIG. 7 is a schematic diagram showing a time sequence of operation in the touch sensing stage P2 of the touch display panel 100 in accordance with some embodiments of the invention. The touch sensing stage P2 of the touch display panel 100 is separated into a block touch sensing stage P21 and an all-on touch sensing stage P22. In the block touch sensing stage P21, the driving circuit 150 applies the common voltage signal $V_{COM}$ to the touch sensing groups in sequence (e.g. row-by-row for the embodiment of FIG. 4) of the touch display panel 100. The touch display apparatus 10 may repeat scanning the touch sensing pads T(1,1)-T(M,N) from the first row to the last row for touch sensing in one or more times in the block touch sensing stage P21. Then, in the all-on touch sensing stage P22, the driving circuit 150 applies a touch detection signal $V_{TD}$ to all the touch sensing pads T(1,1)-T(M,N) at the same time for touch sensing. Similarly, the touch display apparatus 10 may repeat all-on scanning of the touch sensing pads T(1,1)-T(M,N) for touch sensing in one or more times in the all-on touch sensing stage P22.

Figure 8:
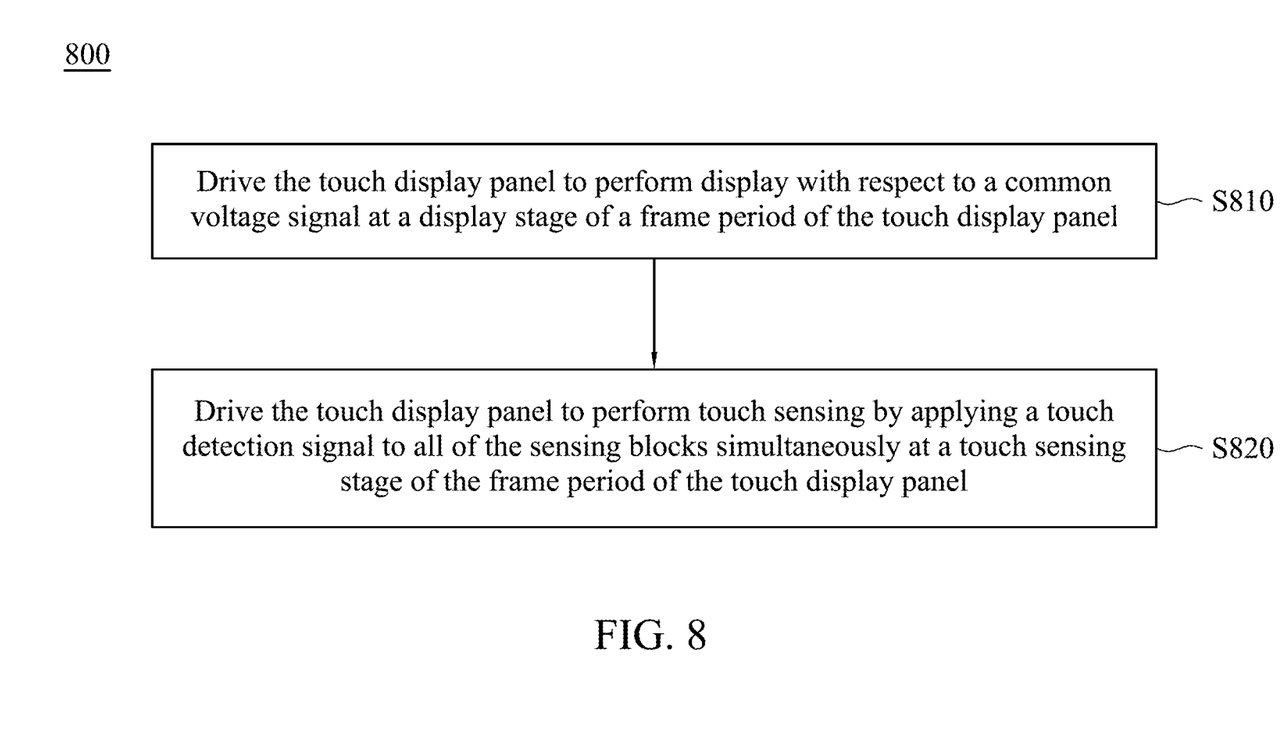
FIG. 8 is a flowchart of a touch sensing method for a touch display panel in accordance with some embodiments of the invention.

FIG. 8 is a flowchart of a touch sensing method 800 for a touch display panel in accordance with some embodiments of the invention. The touch sensing method 800 may be executed by a driving circuit, such as a TDDI circuit or several circuits which capable of cooperatively perform display driving as well as touch driving on the touch display panel, and the touch display panel controlled by the touch sensing method 800 may be the touch display panel 100 in FIG. 1A or another similar touch display panel with touch sensing pads arranged in touch sensing groups. The touch sensing method 800 includes Steps S810 and S820. In Step S810, at a display stage of a frame period of the touch display panel, the touch display panel is driven to perform display with respect to a common voltage signal. The common voltage signal applied to the touch display panel during the display stage may be a DC voltage signal. In Step S820, at a touch sensing stage of the frame period of the touch display panel, the touch display panel is driven to perform touch sensing by applying a touch detection signal to all of the touch sensing pads in the touch sensing groups simultaneously. The touch detection signal applied to the touch display panel during the touch sensing stage may be an AC voltage signal with a sinusoidal waveform, a triangle waveform, a sawtooth waveform, a trapezoidal waveform, or the like.

In particular, in some embodiments, each frame period may be divided into a block touch sensing stage and an all-on touch sensing stage, and Step S820 includes the following steps: in the block touch sensing stage, the touch display panel is driven by applying the touch detection signal to the touch sensing groups in sequence, and in the all-on touch sensing stage, the touch display panel is driven by applying the touch detection signal to all the touch sensing pads simultaneously. Depending on the design of the touch display panel and the circuit(s) for driving the touch display panel, the step of applying the touch detection signal to the touch sensing groups in sequence may be repeated for touch sensing in one or more times in the block touch sensing stage, and/or the step of applying the touch detection signal to all the touch sensing pads simultaneously for touch sensing may be repeated in one or more times in the all-on touch sensing stage.

By implementing the embodiments of the invention, the touch display apparatus may still perform touch sensing with high accuracy even if it is floated and the touch area thereon is large. In addition, the number of circuits (such as the circuitries 310(1)-310(N) shown in FIG. 3A) for driving the touch sensing pads is significantly reduced because each circuit may provide a touch detection signal to all the connected touch sensing pads simultaneously for detecting a touch event even if the touch display apparatus is floated.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A touch display apparatus, comprising:
   a touch display panel configured for display and touch sensing, wherein the touch display panel comprises a plurality of scan lines, a plurality of data lines and a plurality of touch sensing pads arranged in touch sensing groups; and
   a driving circuit coupled to the touch display panel, wherein the driving circuit is configured to drive the touch display panel to perform display with respect to a common voltage signal at a display stage of a frame period and to drive the touch display panel to perform touch sensing by applying a touch detection signal to all of the touch sensing pads simultaneously but without applying a load canceling signal to the scan lines and the data lines at a touch sensing stage of the frame period.

2. The touch display apparatus of claim 1, wherein the touch sensing stage comprises a block touch sensing stage and an all-on touch sensing stage;
   wherein the driving circuit applies the touch detection signal to the touch sensing groups in sequence in the block touch sensing stage; and
   wherein the driving circuit applies the touch detection signal to all the touch sensing pads simultaneously in the all-on touch sensing stage.

3. The touch display apparatus of claim 2, wherein the driving circuit is configured to repeat applying the touch detection signal to the touch sensing groups in sequence in one or more times in the block touch sensing stage.

4. The touch display apparatus of claim 2, wherein the driving circuit is configured to repeat applying the touch detection signal to all the touch sensing pads simultaneously in one or more times in the all-on touch sensing stage.

5. The touch display apparatus of claim 1, wherein the touch sensing groups are respective blocks of j×k of the touch sensing pads partitioned from a display and touch sensing area of the touch display panel, where j and k are integers greater than 1.

6. The touch display apparatus of claim 1, wherein the touch sensing groups are respective rows of the touch sensing pads.

7. The touch display apparatus of claim 1, wherein the touch sensing groups are respective columns of the touch sensing pads.

8. The touch display apparatus of claim 1, wherein the touch detection signal is an alternative current (AC) voltage signal.

9. The touch display apparatus of claim 1, wherein the touch display panel is an in-cell type touch display panel.

10. The touch display apparatus of claim 1, wherein the touch display panel is a liquid crystal display panel.

11. The touch display apparatus of claim 1, wherein the driving circuit is a touch and display driving integration (TDDI) circuit.

12. A method for a touch display panel configured for display and touch sensing, the touch display panel comprising a plurality of scan lines, a plurality of data lines and a plurality of touch sensing pads arranged in touch sensing groups, the method comprising:
    driving the touch display panel to perform display with respect to a common voltage signal at a display stage of a frame period; and
    driving the touch display panel to perform touch sensing by applying a touch detection signal to all of the touch sensing pads simultaneously but without applying a load canceling signal to the scan lines and the data lines at a touch sensing stage of the frame period.

13. The method of claim 12, further comprising:
    applying the touch detection signal to the touch sensing groups in sequence in a block touch sensing stage of the touch sensing stage; and
    applying the touch detection signal to all the touch sensing pads simultaneously in an all-on touch sensing stage of the touch sensing stage.

14. The method of claim 13, wherein the step of applying the touch detection signal to the touch sensing groups in sequence is repeated in one or more times in the block touch sensing stage.

15. The method of claim 13, wherein the step of applying the touch detection signal to all the touch sensing pads simultaneously is repeated in one or more times in the all-on touch sensing stage.

* * * * *